United States Patent
Moebius et al.

(10) Patent No.: US 11,048,053 B2
(45) Date of Patent: Jun. 29, 2021

(54) MOVABLE FLEXURE AND MEMS ELEMENTS FOR IMPROVED OPTICAL COUPLING TO PHOTONIC INTEGRATED CIRCUITS

(71) Applicant: The Charles Stark Draper Laboratory, Inc., Cambridge, MA (US)

(72) Inventors: Michael G. Moebius, Arlington, MA (US); Steven J. Spector, Lexington, MA (US); Eugene H. Cook, Acton, MA (US); Sean P. O'Connor, Quincy, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/697,821

(22) Filed: Nov. 27, 2019

(65) Prior Publication Data

US 2021/0157067 A1  May 27, 2021

(51) Int. Cl.
*G02B 6/42* (2006.01)
*G02B 26/08* (2006.01)

(52) U.S. Cl.
CPC ........... *G02B 6/422* (2013.01); *G02B 6/4214* (2013.01); *G02B 26/0808* (2013.01); *G02B 26/0841* (2013.01)

(58) Field of Classification Search
CPC .................................................... G02B 6/422
See application file for complete search history.

(56) References Cited

U.S. PATENT DOCUMENTS

| | | | |
|---|---|---|---|
| 7,136,554 B1* | 11/2006 | Stevens | G02B 6/4214 385/39 |
| 9,874,742 B2* | 1/2018 | Petronius | G02B 26/0833 |
| 9,876,575 B2* | 1/2018 | Butrie | H04J 14/06 |
| 10,146,020 B1* | 12/2018 | Yasumura | G02B 6/4206 |
| 10,211,925 B2* | 2/2019 | Butrie | H04B 10/503 |
| 2009/0074358 A1* | 3/2009 | Itagi | G02B 6/34 385/37 |
| 2009/0168625 A1* | 7/2009 | Lee | G11B 7/1353 369/100 |
| 2011/0002527 A1* | 1/2011 | Jeong | G01R 31/309 382/141 |

(Continued)

OTHER PUBLICATIONS

Pu, et al., "Ultra-low-loss inverted taper coupler for silicon-on-insulator ridge waveguide," Optics Communications, vol. 283, Issue 19, 3678-3682, May 17, 2010.

(Continued)

*Primary Examiner* — Sung H Pak
(74) *Attorney, Agent, or Firm* — Sunstein LLP

(57) ABSTRACT

An optical system includes a laser source that provides a beam of light, a photonic integrated circuit (PIC) with an input aperture, and an alignment fixture that has at least one actuator. The alignment fixture may be mounted on the PIC. The optical system is aligned such that the beam of light travels from the laser source to the alignment fixture and from the alignment fixture to the input aperture of the PIC. The alignment fixture can move in at least one direction upon actuation of the at least one actuator to adjust coupling between the laser source and the PIC. The at least one actuator may be a micro-electro-mechanical system (MEMS) structure actuated by an electrical signal.

9 Claims, 11 Drawing Sheets

(56) References Cited

U.S. PATENT DOCUMENTS

| | | | |
|---|---|---|---|
| 2011/0170108 A1* | 7/2011 | Degertekin | G01Q 60/38 |
| | | | 356/454 |
| 2011/0273719 A1* | 11/2011 | Froggatt | G01B 9/02044 |
| | | | 356/446 |
| 2011/0278441 A1* | 11/2011 | Vermeulen | G02B 6/4246 |
| | | | 250/227.23 |
| 2015/0318952 A1* | 11/2015 | Butrie | H04B 10/40 |
| | | | 398/65 |
| 2018/0348455 A1* | 12/2018 | Yasumura | G02B 6/12002 |
| 2019/0052058 A1* | 2/2019 | Edamura | H01S 5/0264 |
| 2019/0245316 A1* | 8/2019 | Zheng | H01S 3/06704 |
| 2020/0049801 A1* | 2/2020 | Sayyah | G01S 17/34 |
| 2020/0219818 A1* | 7/2020 | Menard | H01L 23/5286 |

OTHER PUBLICATIONS

Ding, et al., "Fully etched apodized grating coupler on the SOI platform with —0.58 dB coupling efficiency," Optics Letters, vol. 39, No. 18, 5348-5350, Sep. 15, 2014.

Hu, et al., "SHINE: Seamless Hybrid-integrated Interconnect Network," ENLITENED 2018 Annual Meeting, 38 pages, Oct. 24, 2018.

* cited by examiner

MOVABLE FLEXURE AND MEMS ELEMENTS FOR IMPROVED OPTICAL COUPLING TO PHOTONIC INTEGRATED CIRCUITS

TECHNICAL FIELD

The present invention relates to optical systems, and more particularly to coupling between laser sources and photonic integrated circuits.

BACKGROUND ART

One of the major challenges in integrated photonics lies in optical coupling onto and off of photonic integrated circuits (PICs). Many solutions require precise active alignment in the order of 100 nm accuracy in position and 0.1 degree accuracy in rotation. Further, the active alignment requires completing the alignment with an optical source turned on and using feedback during the alignment process. For mass production of integrated photonic devices, this requires extensive alignment steps, followed by fixing all optical components in a manner that prevents movement of, e.g., 100 nm or more. Several issues arise from these challenges: (1) alignment equipment capable of this level of precision is expensive; (2) alignment is often slow and difficult to scale up to volume; (3) the epoxy used to fix the optical components will often shift during curing, resulting in misalignment; and (4) alignment can degrade due to thermal shift, vibrations, and stress on the optical assembly.

The approximate precision required for aligning optical sources with PICs is a function of the optical beam width. It is normally assumed that alignment must be within 15% of the beam size and 15% of the beam divergence for high efficiency. In addition, the gap between the optical source and the PIC must correspond with the depth of focus of the optical beam and thus has its own precision requirements. For example, a laser beam that is 1 µm wide results in a gap tolerance of about 1 µm, a positional tolerance of about 150 nm, and an angular or rotational tolerance of about 5 degrees. A laser beam that is 1.5 µm wide results in a gap tolerance of about 3 µm, a positional tolerance of about 200 nm, and a rotational tolerance of about 3 degrees. A 2 µm wide beam results in a gap tolerance of about 5 µm, a positional tolerance of about 300 nm, and a rotational tolerance of about 2 degrees. As can be seen, while the size of the optical beam drives the tolerance, the gap and positional tolerances tend to be below 1 µm.

One method to couple an optical source to a photonic integrated circuit (PIC) used in the prior art is to butt couple the laser directly to the PIC. This requires no intermediate elements between the laser and the PIC but has extremely tight tolerances due to typical laser beam sizes of around 1-2 µm along the fast axis (out of plane of the laser device) and 5-15 µm along the slow axis (in plane of the laser device). Further, the distance between the butt-coupled laser source and PIC should not exceed about 1 µm. Any slight defects in quality of the edge facets of the laser and the PIC also negatively affect the quality of coupling.

To solve the issue of tight tolerances, beam conditioning optics, such as lenses, have been proposed in the prior art. The lenses collimate the beam exiting the laser and focus that beam onto the edge facet, i.e. the input aperture, of the PIC. Most frequently, the lenses are aligned and attached directly to the laser source and also aligned and attached directly to the PIC. The optics must be aligned to tight tolerances of about 1 µm, as explained above. The laser and PIC assemblies are then aligned to each other and fixed in place. Because the beam size between the laser and the PIC, once collimated by the beam conditioning optics, is large, the positional alignment tolerance between these two assemblies will be large in comparison to butt-coupling, e.g. on the order of tens of micrometers. While the larger beam size results in larger positional tolerances, it also results in tighter rotational tolerances of about 0.1 degree. However, rotational tolerances of this magnitude are easier to achieve than positional alignment accuracies of less than 1 µm. But even with collimated laser beams, the issues listed above still persist: alignment equipment capable of this level of precision is expensive; alignment is often slow and difficult to scale up to volume; the epoxy used to fix the optical components will often shift during curing, resulting in misalignment; and alignment can degrade due to thermal shift, vibrations, and stress on the optical assemblies.

Another common method of improving coupling tolerances involves mode expansion. PICs are often designed using high refractive index materials. This provides compact guided modes which can be routed through small bends, enabling densely packed photonic devices. However, this also results in the nanometer-scale precision requirement on coupling. Larger guided modes are easier to couple to. Mode expansion can be achieved by using tapered waveguides and lower index guiding materials to transfer the mode from a highly confined small-scale waveguide to a larger, low-index waveguide. One challenge with this approach is that it requires adding different materials to the PIC fabrication process, which can raise compatibility challenges. Additionally, multiple mode expansion steps may be required to achieve a sufficiently large mode to enable coupling with lenient tolerances. Each mode expansion step results in losses and additional fabrication steps and materials.

SUMMARY OF THE EMBODIMENTS

The deficiencies of the prior art are overcome by providing alternative laser coupling solutions The embodiments described herein increase the alignment tolerances for laser-to-PIC coupling by utilizing movable flexures and/or micro-electro-mechanical system (MEMS) elements. The embodiments described herein are also capable of maintaining optimal alignment as they can correct for alignment degradation. These embodiments are applicable to other laser-to-PIC coupling methods as a means of increasing the tolerances while maintaining high coupling efficiency. In addition, the embodiments described herein can be applied to any application requiring light to be coupled between single mode guiding elements, for example, coupling a signal from a PIC into a single mode fiber.

In accordance with one embodiment of the invention, an optical system includes a laser source that provides a beam of light, a PIC with an input aperture, and an alignment fixture that has at least one actuator. The alignment fixture may be mounted on the PIC. An optical element may be mechanically coupled to the alignment fixture. The optical system is aligned such that the beam of light travels from the laser source to the optical element and from the optical element to the input aperture of the PIC. The alignment fixture can move in at least one direction upon actuation of the at least one actuator to adjust coupling between the laser source and the PIC.

The optical system may also include beam conditioning optics. The beam of light may travel from the laser source through the beam conditioning optics to the alignment fixture.

In other embodiments, the alignment fixture may be a MEMS structure actuated by an electrical signal. In yet other embodiments, the optical element may include a mirror that is rotatably coupled to the alignment fixture about an axis of rotation. A first actuator of the at least one actuator then determines a degree of tilt of the mirror about the axis of rotation. The mirror may further be movable about a second axis in addition to the axis of rotation. A second actuator of the at least one actuator then moves the mirror about the second axis.

In yet another embodiment, the alignment fixture may include a movable MEMS element such that the movable MEMS element adjusts an orientation of the optical element about at least one axis. In a further embodiment, the alignment fixture may include a movable MEMS element and the optical element may include a grating element such that the movable MEMS element adjusts a position of the grating element in at least one plane. In another embodiment, the alignment fixture may include a movable MEMS element and the optical element may include a lens such that the movable MEMS element adjusts at least one of a position and an orientation of the lens.

In accordance with a further embodiment of the invention, an apparatus includes a laser source that provides a beam of light, a PIC with an input aperture, a mechanical flexure mounted on the PIC, at least one lens movably mounted on the flexure and a mirror movably mounted on the flexure. The laser source, mechanical flexure, and PIC are aligned and fixed in place such that the beam of light travels from the laser source to the at least one lens, from the at least one lens to the mirror, and from the mirror to the input aperture of the PIC. The mechanical flexure allows movement of the at least one lens to adjust a position of the beam of light on the input aperture of the PIC. The mechanical flexure also allows movement of the mirror to adjust coupling of the beam of light into the input aperture of the PIC. The mirror may be rotatably mounted about a first axis so that the mirror can tilt about the first axis. In other embodiments, the mirror may further be mounted such that it can twist about a second axis. A degree of tilt of the mirror about the first axis may be determined by a first actuator. Movement of the mirror about the second axis may be determined by a second actuator.

In accordance with another embodiment of the invention, an apparatus includes a laser source that provides a beam of light, a MEMS actuator, a mirror mounted on the MEMS actuator, and a PIC with an input aperture. The laser source, mirror, and PIC are aligned such that the beam of light travels from the laser source to the mirror and from the mirror to the input aperture of the PIC. The MEMS actuator may adjust an orientation of the mirror about at least one axis when actuated by an electrical signal to adjust coupling of the beam of light into the input aperture of the PIC.

In related embodiments, the MEMS actuator may adjust an orientation of the mirror about two axes. The MEMS actuator may be mounted to an angled facet of a chip. The input aperture of the PIC may also include grating to further adjust the coupling between the beam of light and the grating.

In accordance with a further embodiment of the invention, an apparatus includes a laser source that provides a beam of light, a PIC with an input waveguide with movable grating, and at least one MEMS actuator coupled to the movable grating and mounted on the PIC. The laser source and the grating are aligned such that the beam of light travels from the laser source to the grating, and the at least one MEMS actuator adjusts at least one of a position and an orientation of the movable grating when actuated by an electrical signal to adjust coupling of the beam of light into the input waveguide of the PIC.

In related embodiments, the at least one MEMS actuator adjusts the position of the movable grating along a first axis defined by a major axis of the waveguide. The at least one MEMS actuator may further adjust the position of the movable grating along a second axis defined by a minor axis of the waveguide. The at least one MEMS actuator may also adjust the orientation of the grating about a rotational axis perpendicular to the waveguide.

In accordance with yet another embodiment of the invention, an apparatus include a laser source that provides a beam of light, PIC with an input aperture, a MEMS stage, and at least one lens mounted on the MEMS stage. The laser source, the at least one lens, and the PIC are aligned such that the beam of light travels from the laser source to the lens and from the lens to the input aperture of the PIC. The MEMS stage include at least one actuator configured to move the MEMS state in at least one direction when actuated by an electrical signal to adjust coupling of the beam of light into the PIC.

In related embodiments, the MEMS stage may have a first surface and the at least one actuator move the MEMS stage in a plane parallel to the first surface. The at least one actuator may further move the MEMS state in a direction perpendicular to the first surface. The at least one actuator may be a comb drive. Further, the MEMS stage may have a range of movement that is larger in the plane parallel to the first surface than it is in the direction perpendicular to the first surface.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

To improve coupling characteristics for coupling light into and out of a PIC, a combination of MEMS elements, flexures, and/or light shaping elements can be placed between a laser source and the input aperture of the PIC. The following discussion is presented in terms of arrangements for coupling light from a laser source into a PIC, but it should be understood that the invention also is useful going the other way to couple light outputs from a PIC. Also, while the discussion is presented speaking of optical gratings, mirrors, and lenses moved by MEMS elements, the invention is not limited to such specific structures, and the optical structures used for alignment adjustment could usefully be some other optical structure such as an arrangement of lenses and mirrors.

Figure 1A:
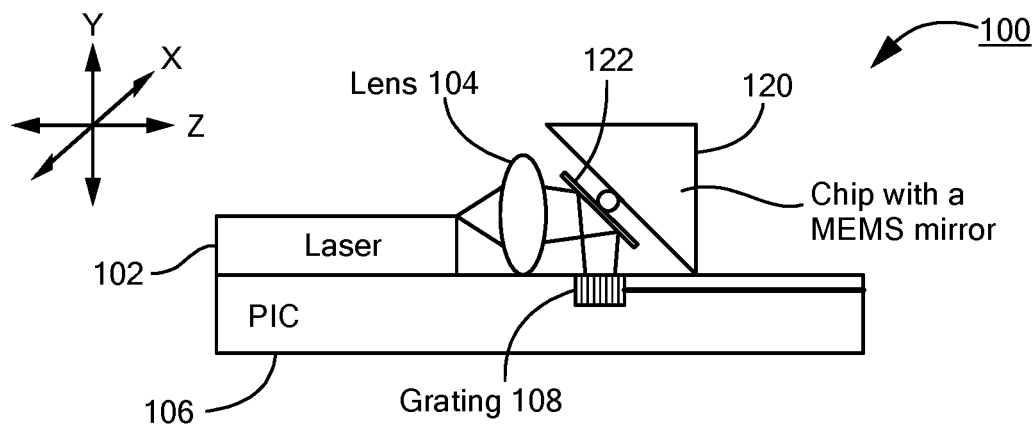
FIG. 1A depicts an optical system in accordance with an embodiment of the present invention.
Figure 1B:
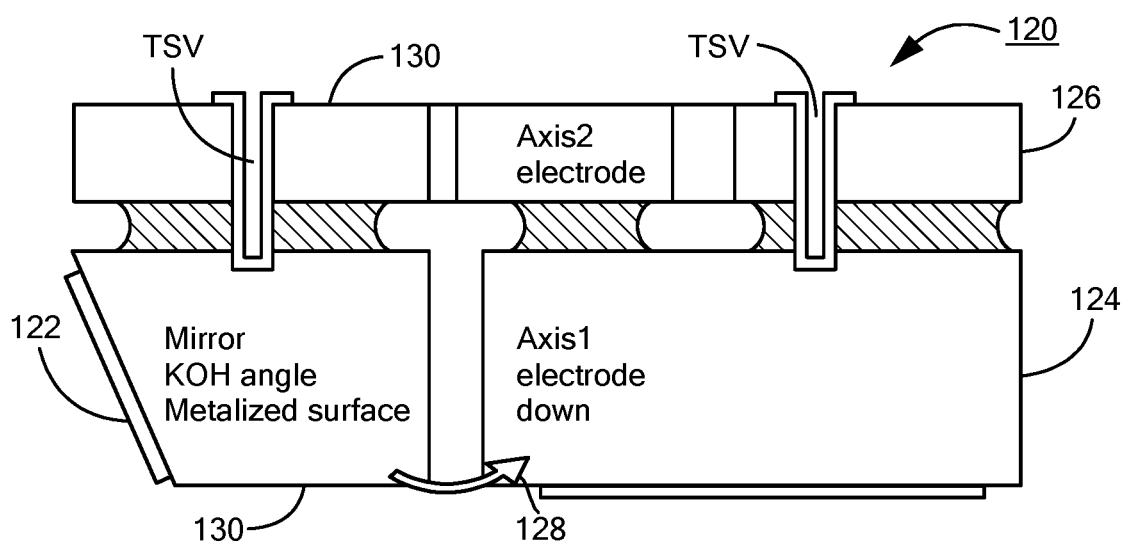
FIG. 1B is a cross-sectional view of a MEMS element in accordance with an embodiment of the present invention.
Figure 1C:
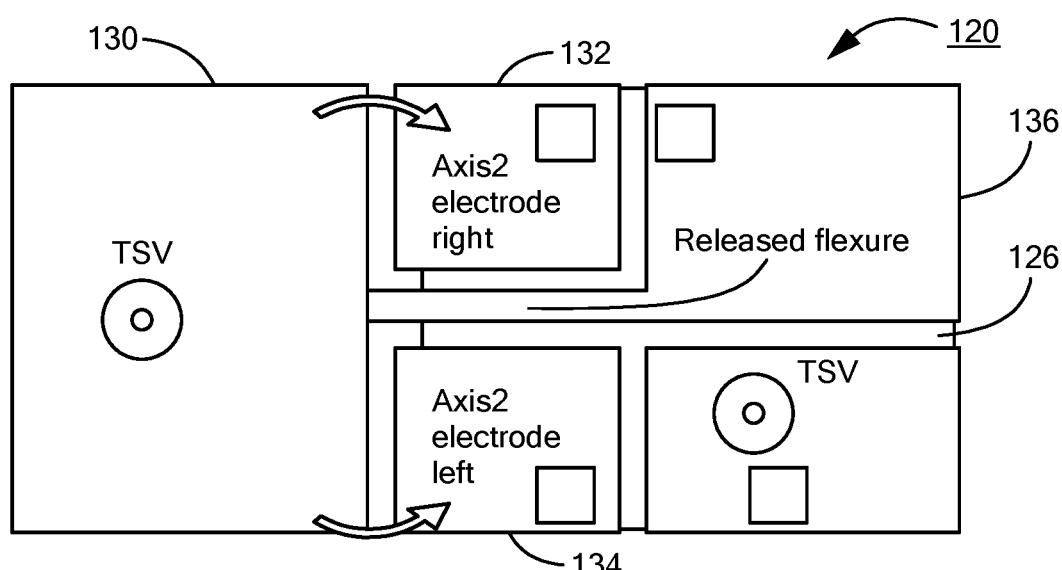
FIG. 1C is a top view of a MEMS element in accordance with an embodiment of the present invention.

FIGS. 1A, 1B, and 1C depict an optical system 100 in an illustrative embodiment of the invention. A laser source 102 provides a beam of light. The beam of light tends to diverge rapidly upon exiting a single mode aperture, thus requiring beam conditioning optics 104 to collimate or refocus the beam of light. One or more beam condition optics 104, such as lenses or other optical elements, may be used to collect the rapidly diverging light from the laser source and refocus it to a specified distance from the beam conditioning optics. Generally, the light may be refocused on the input aperture of the PIC 106 which may be a waveguide facet or a grating coupler 108. Without another intermediate element to redirect the light, the beam condition optics must be placed within 100-1000 nm tolerances for the coupling between the laser and PIC to be efficient.

In order to gain additional tolerance for placement of the optical elements, a MEMS element 120 having a mirror 122 mounted on it may be placed along the beam path between the laser source and the PIC input aperture. The laser 102 and beam conditioning optics 104 are initially aligned so as to achieve reasonably good coupling. The MEMS element 120 then adjusts the mirror 122 to redirect the beam into a more optimal location on the PIC input aperture. Slight angular adjustments of a mirror tend to be easier than translational adjustments because they involve movements on the order of micrometers. The MEMS element 120 may also be enabled to continuously adjust the alignment of the optical system 100 and maximize coupling efficiency into the PIC during operation of the optical system. Additionally, even without continuous adjustment, misalignments of the optical system that may occur during operation of the system can be corrected by adjusting the mirror position, whereas readjustment of optical elements is often impossible following fixing with epoxy.

FIGS. 1B and 1C show a cross-section and top view, respectively, of the MEMS element 120 and mirror 122 in greater detail. The MEMS element 120 may have a first silicon-on-insulator (SOI) layer 124. The MEMS element 120 may further have a second SOI layer 126. Between the first and second SOI layers there may be a sacrificial oxide layer. The first SOI layer 124 may have a first axis electrode 128. The first axis electrode 128 may be configured to move mirror element 130 towards the electrode 128 when actuated by an electrical signal, as indicated by the arrow. The mirror 122 may be mounted to the mirror element 130 at an angle. However, the placement of the mirror shown in FIGS. 1B and 1C is merely illustrative. The mirror could be mounted to the mirror element 130 at a different angle or at no angle at all. Exemplarily, the movement of the mirror element 130 towards the first axis electrode 128 together with the angle of the mirror 122 lead to an angular downward motion of the mirror 122 when the first axis electrode 128 is actuated. The first SOI layer 124 may also be mounted on and bounded to the PIC 106.

The second SOI layer 126 may have a right second axis electrode 132 and a left second axis electrode 134. The right and left second axis electrodes may be arranged on the right and left side of a flexure 136 which is attached to mirror element 130. Without an electrical signal applied to the right second axis electrode 132 and the left second axis electrode 134, the flexure may be positioned in the middle between the two second axis electrodes and therefore hold the mirror element 130 in a center position. Upon application of a voltage to the right second axis electrode 132, the electrode pulls the flexure 136 towards itself, as indicated by the arrow, resulting in a rotation of the mirror element 130 towards the right. Upon application of a voltage to the left second axis electrode 134, the electrode pulls the flexure 136 towards itself, as indicated by the arrow, resulting in a rotation of the mirror element 130 towards the left. By application of selected voltages to the right and left second axis electrodes 132 and 134, the flexure 136 and mirror element 130 can therefore be rotated to any desired position within the range of movement of flexure 136.

Figure 1D:
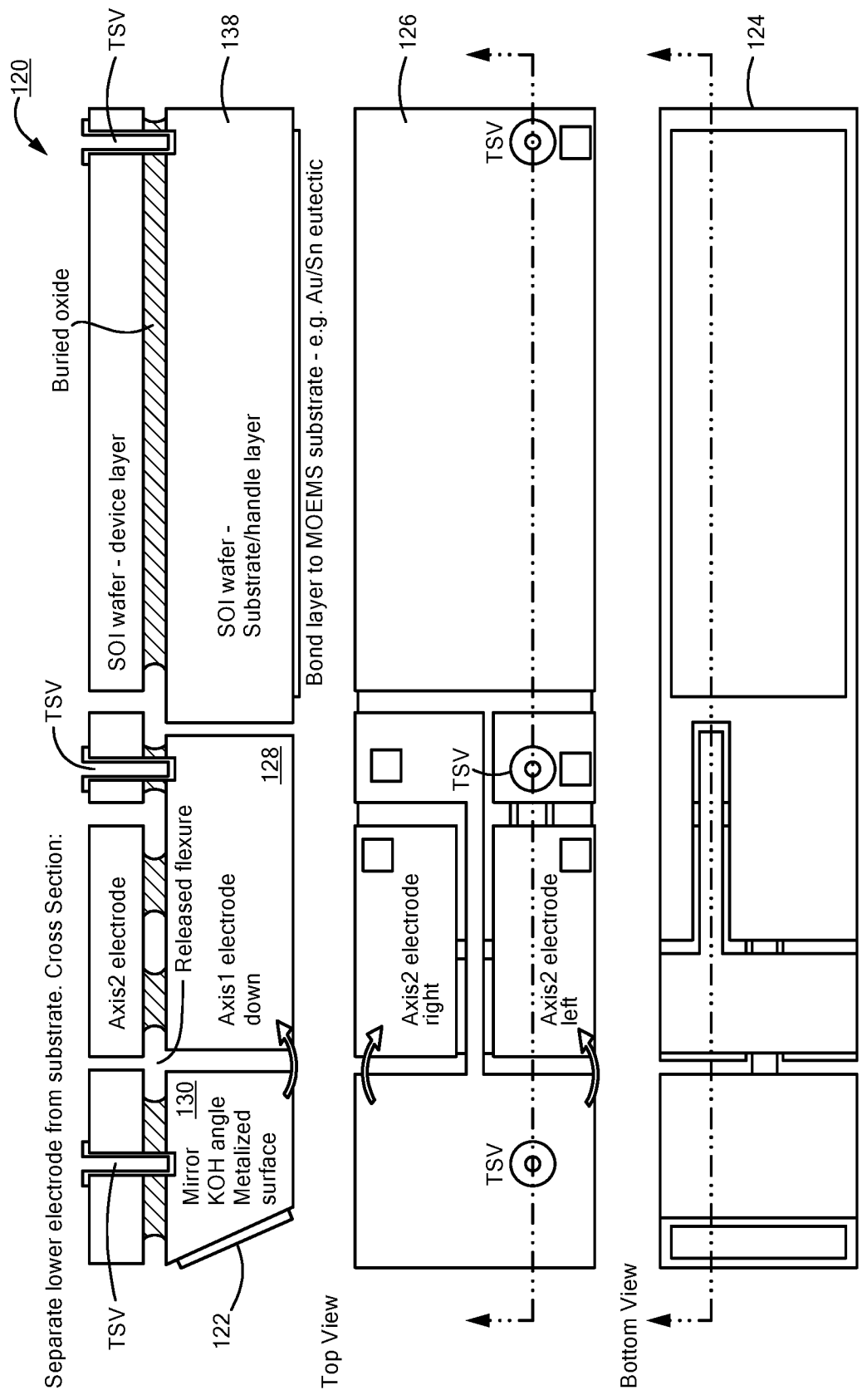
FIG. 1D shows cross-sectional, top, and bottom views of a MEMS element in accordance with another embodiment of the present invention.

FIG. 1D shows a cross-section, top view, and bottom view of an alternative arrangement of MEMS element 120. Here, the first axis electrode 128 is separated from the substrate 138 of the first SOI layer 124. The substrate 138 is mounted on and bonded to PIC 106.

Figure 1E:
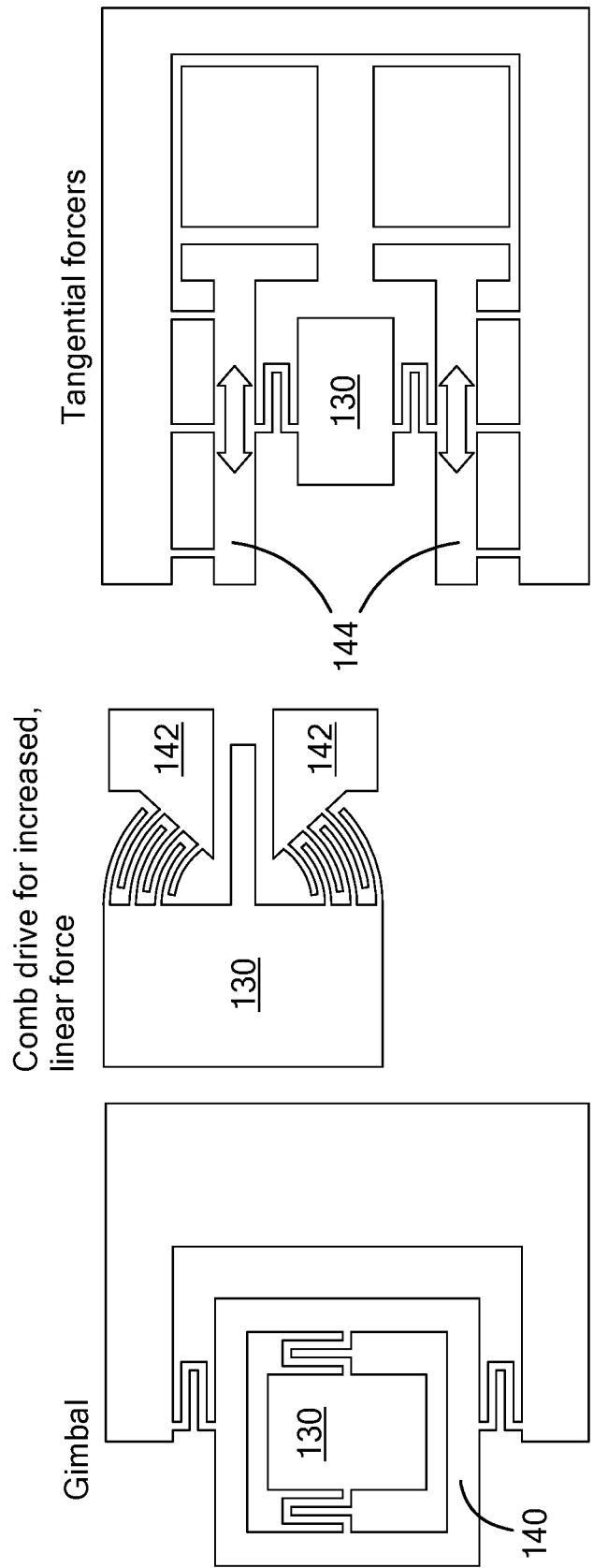
FIG. 1E shows alternative MEMS elements in accordance with further embodiments of the present invention.

FIG. 1E depicts alternative flexures for MEMS element 120. Specifically, the mirror element 130 with mirror 122 (not shown) may be attached to a substrate or SOI layer and actuated in various ways known to a person having skill in the art. For example, the flexure and support structures may be arranged as a gimbal 140. Actuators may move and/or rotate the mirror element about two axes. The gimbal structure then allows for three-dimensional placement of the mirror element with two sets of actuators. Another arrangement may be a comb drive. Two comb drive electrodes 142 may be used to translate and angle mirror element 130. A further arrangement may include tangential forcers. The tangential forcers 144 may be located on either side of mirror element 130, as shown in FIG. 1E, to translate the mirror element through a flexure. When the tangential forcers 144 move at the same time and in the same direction, the mirror element can be translated back and forth. When the tangential forcers 144 move in opposite directions to each other, or when only one tangential forcer 144 is actuated, the mirror element 130 rotates between the tangential forcers.

Figure 2A:
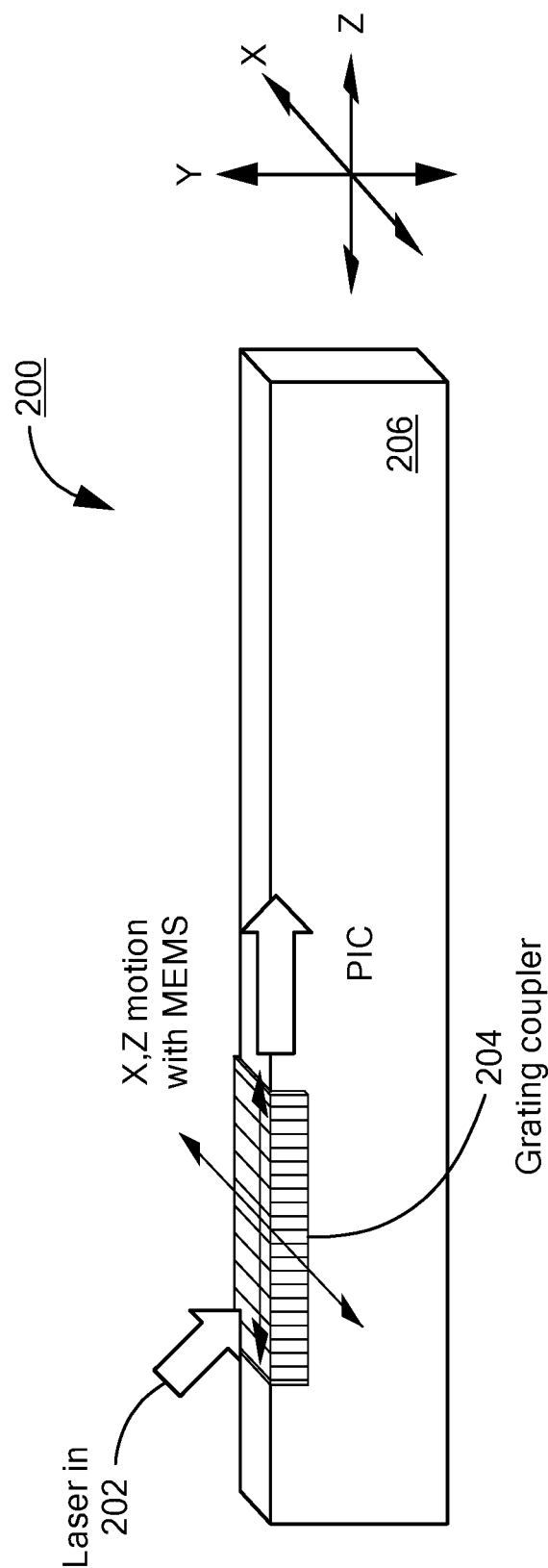
FIG. 2A depicts an optical system in accordance with yet another embodiment of the present invention.
Figure 2B:
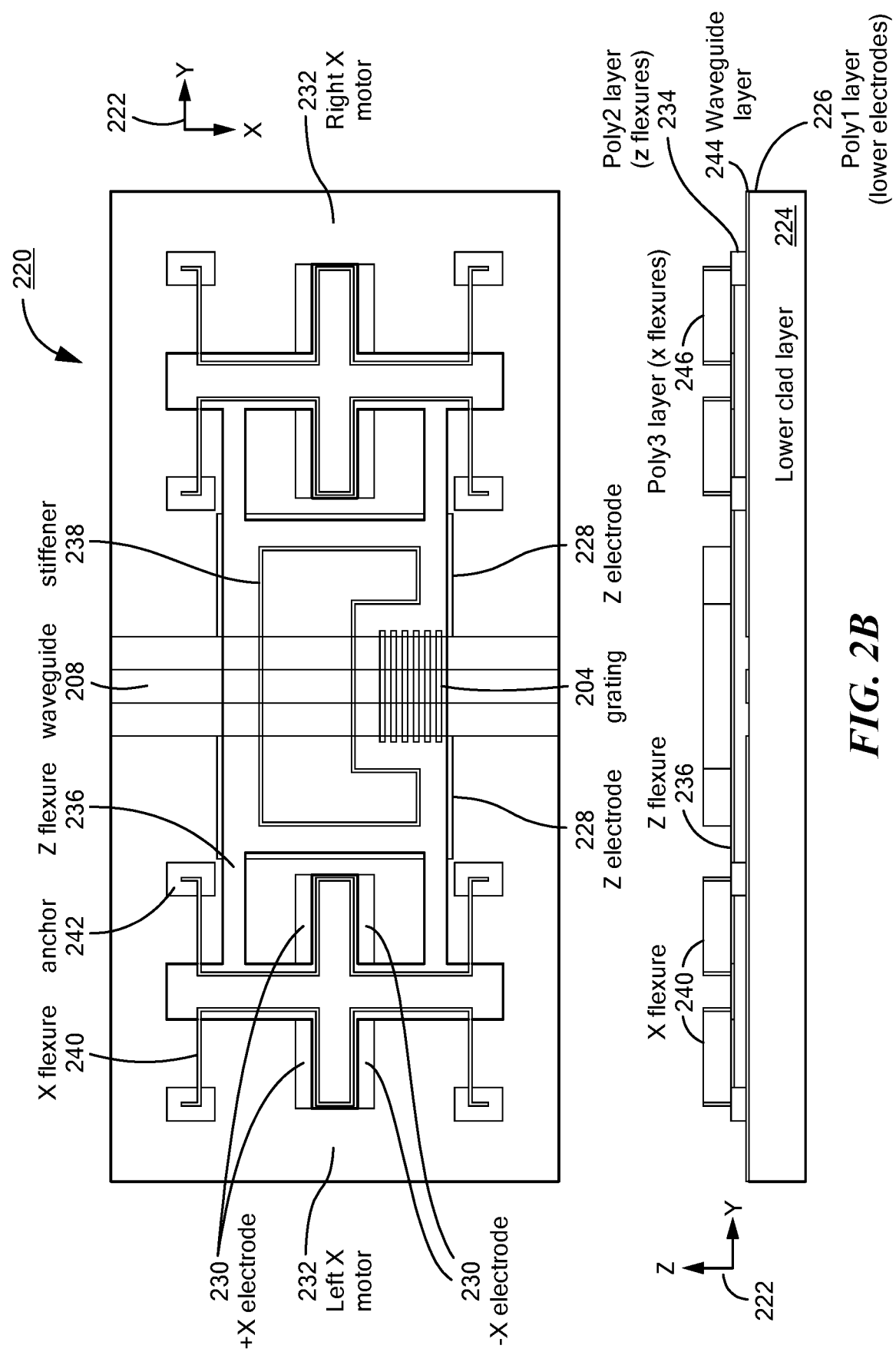
FIG. 2B shows a top view and a cross-sectional view of a MEMS element in accordance with an embodiment of the present invention.

FIGS. 2A and 2B show optical system 200 in an alternative embodiment of the invention. A laser source 202 provides a beam of light. The beam of light may or may not be conditioned by beam conditioning optics (not shown). Grating element 204 is then utilized to couple the beam of light into a PIC 206. The grating element 204 is mounted on MEMS element 220. By placing the grating element 204 on the movable MEMS element 220, the position of the grating element 204 can be adjusted to optimize coupling between the laser 202 and a waveguide 208 on the PIC 206. This requires lateral (in-plane) movement of the grating element 204, which can be enabled by MEMS actuators as described below, for example comb drives. However, any other kind of MEMS actuator known to a person having skill in the art may be used instead of comb drives.

The greatest ability to optimize the coupling is given by movement of the MEMS element 220 with the grating element 204 mounted thereon along the length of the waveguide 208, where the amount of potentially added tolerance is determined by the range of movement in the MEMS element 220. Tolerance perpendicular to the waveguide 208 is determined by the width of the waveguide 208 and width of the guided mode, and also by the range of movement of the MEMS element 220 with the grating element 204 mounted thereon. A wide waveguide provides greater tolerance perpendicular to the waveguide propagation direction.

Figure 2C:
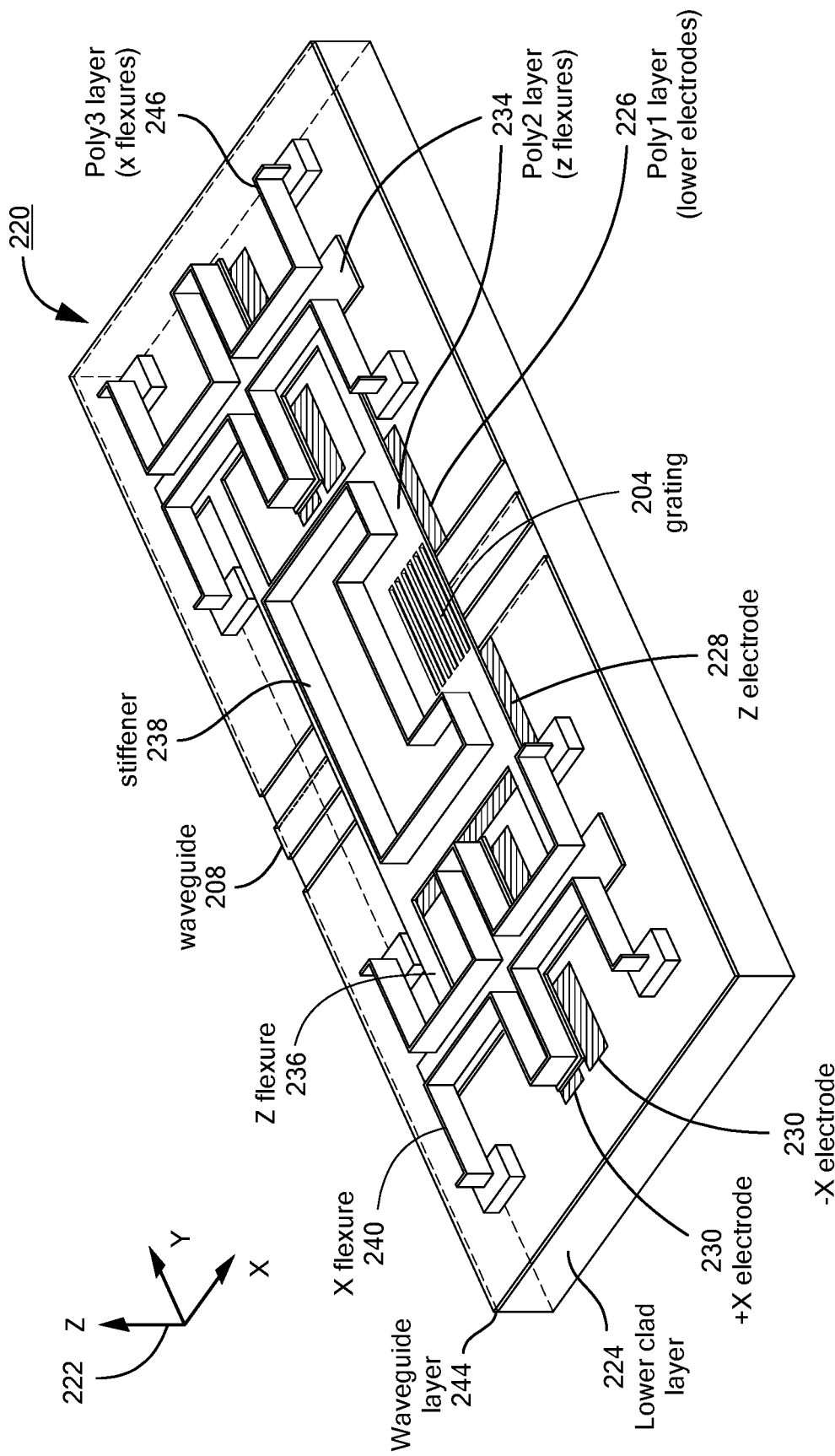
FIG. 2C shows an overview of a MEMS element in accordance with an embodiment of the present invention.

FIGS. 2B and 2C show MEMS element 220 in greater detail. MEMS element 220 includes actuators for movement in X and Z direction, as indicated by directional indicator 222. The MEMS element 220 has a lower optical cladding layer 224. Mounted on top of the optical cladding layer 224 is a first polysilicon layer 226. The first polysilicon layer 226 includes electrodes to actuate the actuators of the MEMS element. For example, the first polysilicon layer 226 may include Z electrodes 228 that move the Z direction actuators when actuated by an electrical signal. The first polysilicon layer 226 may further include X electrodes 230 that move the X direction actuators when actuated by an electrical signal. The Z electrodes 228 may be located on either side of the waveguide 208, and the X electrodes 230 may be located further away from the waveguide, as shown in FIG. 2B. The X electrodes 230 may further be arranged in two groups of four electrodes each to form two X motors 232. However, it is expressly contemplated that the X electrodes 230 may be arranged in any other arrangement suitable to move the grating element 204 in X direction.

On top of the first polysilicon layer 226 that includes the electrodes 228 and 230, nitride is deposited and etched to form the waveguide 208 in a waveguide layer 244. A first sacrificial layer of oxide (not shown) is then deposited on top of the nitride waveguide layer 244 to set the spacing for the grating element 204. The first sacrificial oxide layer is further etched to form holes for anchors 242. On top of the first sacrificial layer of oxide a second polysilicon layer 234 is deposited. The second polysilicon layer 234 is patterned to form the grating element 204. The second polysilicon layer 234 further forms Z flexures 236 and much of the structure of the MEMS element 220. The second polysilicon layer 234 also includes additional X electrodes 230 and Z electrodes 228. For example, the X and Z electrodes in the second polysilicon layer may be motor electrodes, while the electrodes in the first polysilicon layer may be stator electrodes.

A second sacrificial oxide layer (not shown) is deposited on top of the second polysilicon layer 234. The second sacrificial oxide layer is etched to form holes down to the second polysilicon layer 234. A third polysilicon layer 236 coats the sidewalls of the second sacrificial oxide layer. The third polysilicon layer 236 is patterned and etched to form a stiffener 238. The third polysilicon layer 236 is further patterned and etched to form ribs on the X motor electrodes 230 and X flexures 240. At the end of the manufacturing process, the first and second sacrificial oxide layers are dissolved to free the structure of the MEMS element 220.

Importantly, the Z flexures 236 are thin in Z direction but wide in X direction, because they were deposited on a flat surface, namely the first sacrificial oxide layer. They are much stiffer when bending in X direction as compared to bending in Z direction. Thus, the Z flexures 236 permit Z motion which is required to actuate the grating element 204 in Z direction. This occurs when voltage is applied between the Z motor electrodes and the Z stator electrodes, pulling the central part of the MEMS element 220 down. Likewise, the X flexures 240 are thin in X direction but thick in Z direction because they were deposited on the sidewalls of the second sacrificial oxide layer. They therefore bend much more readily in X direction than in Z direction. Motion in X direction is caused by applying voltages to the X stator electrodes relative to the X motor electrodes. Since the X flexures 240 resist motion in Z direction, applying voltage to the X electrodes 230 does not cause significant motion in Z direction for the X motors 232. Instead, since the X stator electrodes are partially overlapped with the X motor electrodes, the applied voltage causes a force that seeks to align the two electrodes, e.g. a force in the X direction. Depending on which X electrodes are activated, this force can be either in a positive or negative X direction.

There are independent X motors 232 on the left and right side of the grating element 204. Each X motor 232 has the capability to move in positive or negative X direction. When activated together and in the same direction, the whole structure will translate in positive or negative X direction. Thus, the grating element 204 will also translate in positive or negative X direction. Alternatively, the left and right X motors 232 can operate in opposite directions. This causes a rotation of the structure, including the grating element 204. Rotation of the grating element 204 is useful for alignment purposes. Additionally, depending on the design of the MEMS element 220, rotation may cause a displacement of the grating element 204 in Y direction relative to the waveguide 208. The size of the Y displacement depends on the relative X displacements and the lever arms between the center of the structure and the center of the grating element 204, as well as the lever arms between the center of the structure and the centers of the left and right X motors 232. By selecting these distances appropriately, both the amount of rotation and the amount of Y displacement that result from various combinations of left and right X displacements can be chosen.

While the MEMS element 220 may be manufactured from particular materials, namely a nitride waveguide, oxide sacrificial layers, and doped polysilicon structural layer, other material sets are expressly contemplated. For example, the structural layers could be manufactured from nitride or silicon carbide. In that case, conducting regions for electrostatic actuation would need to be added. Metal is another possible material for the structure and electrodes, but may be a poor choice for the grating element itself. Alternative sacrificial layers may include resins or other polymers, or potentially silicon.

It is further possible to implement the MEMS element 220 without the third polysilicon layer. In this case, the X flexures would be implemented in the same layer as the Z flexures. A disadvantage of this approach is that it may be more difficult to restrict X and Z motion for the Z and X flexures, respectively, although deflections in the non-actuated axis may be tolerable for certain geometries. However, the advantage of this approach is an easier fabrication with fewer layers.

Another possible implementation may be to orient the X electrodes in normal rather than tangential direction. In the exemplary MEMS element 220 described above, the Z electrodes operate in a normal direction, i.e. they translate the moving member of the MEMS element in a direction normal to their plane. The X electrodes operate in a tangential manner, i.e. they act to align the motor electrode with the stator electrode in a direction tangential to their plane and without significant displacement in the normal direction. Without flexures that resist motion in the normal direction, this operation mode becomes more challenging. Alternatively, the X stator electrodes may be built in the same layer as the motor electrodes (for example, the second polysilicon layer) so that they act in a normal direction. A potential tradeoff may be a reduction in area of the X electrodes, i.e. the area of the X electrodes would now be defined by the thickness of the second polysilicon layer rather than by an arbitrary rectangle. A reduced X electrode area may result in reduced force per voltage unit.

Figure 3A:
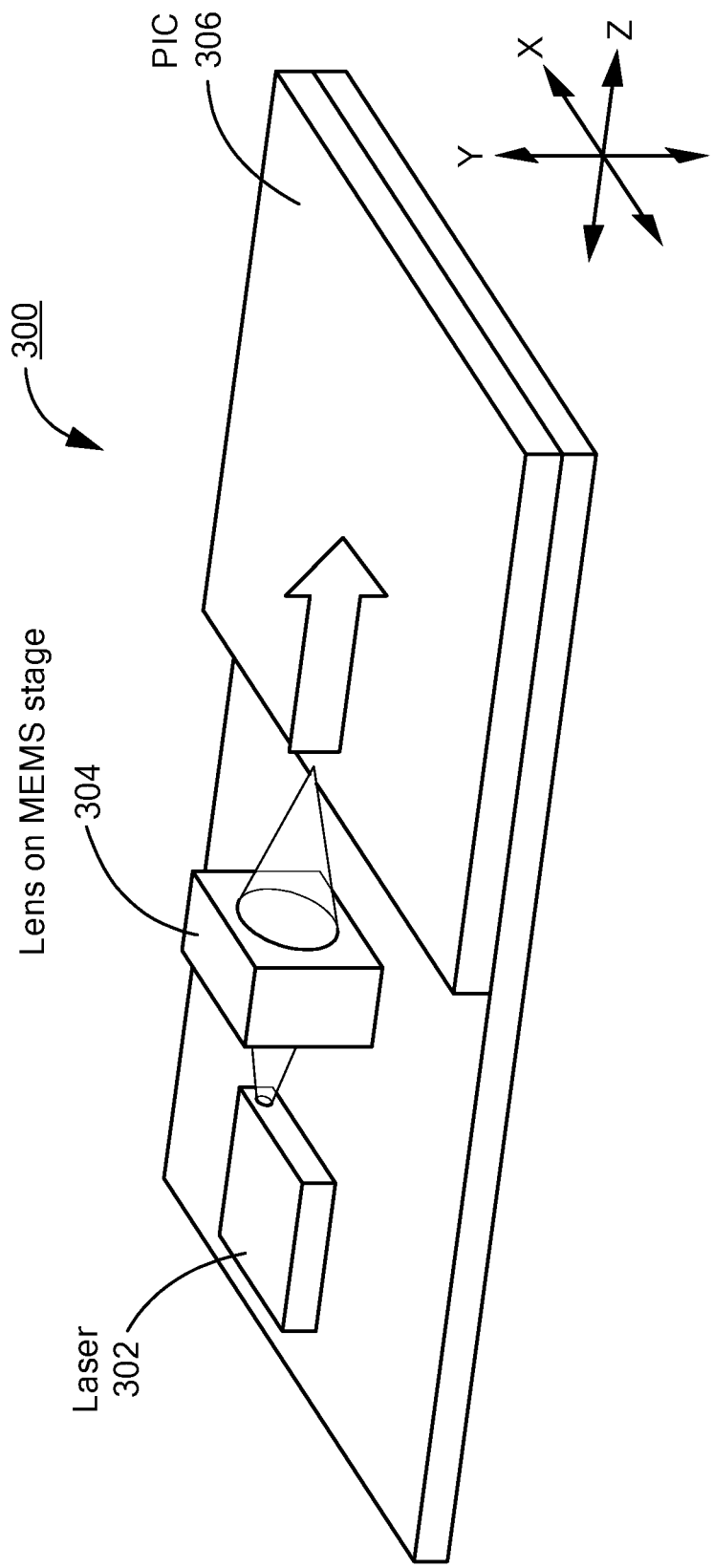
FIG. 3A shows an optical system in accordance with a further embodiment of the present invention.
Figure 3B:
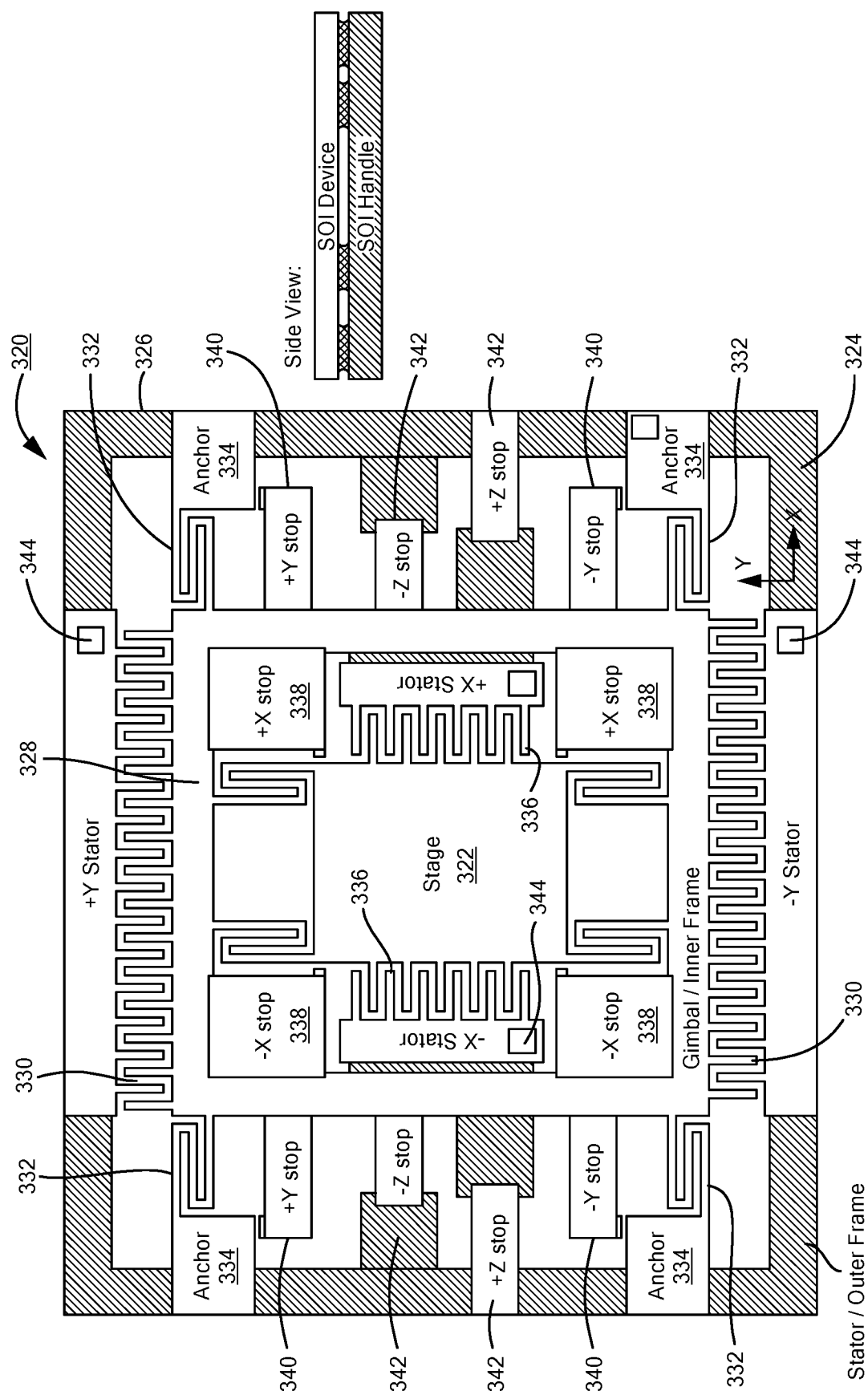
FIG. 3B depicts a MEMS element in accordance with an embodiment of the present invention.

FIGS. 3A and 3B depict optical system 300 as yet another alternative embodiment of the invention. A laser source 302 provides a beam of light that is conditioned by one or more beam conditioning optics 304. One or more of the beam conditioning optics 304 are mounted on a MEMS element 320. This has the advantage of reducing the total number of elements in the optical train by not requiring both lenses and a mirror. An exemplary lens 304 may be mounted on MEMS element 320 and initially placed to reasonably good precision in the optical train with the laser 302 and the PIC 306. For example, the reasonably good precision may be in the order of 1-10 micrometers. The MEMS element 320 is then utilized to optimize the position of the lens 304 within the optical train as described below. This optimization of the position of the lens 304 maximizes the coupling between the laser 302 and the PIC 306. The position of the lens 304 may also be optimized at various time points or continuously during operation of the optical system 300 to address a potential degeneration of the coupling between the laser source 302 and the PIC 306.

FIG. 3B shows the MEMS element 320 in further detail. Lens 304 (not shown in FIG. 3B) is mounted to stage 322. The stage 322 may be movable in two directions X and Y, as indicated by directional indicator 324. The MEMS element 320 is supported by outer frame 326. Inner frame 328 translates in the Y direction when actuated by actuators 330, which exemplarily may be comb drives. The inner frame 328 is suspended by flexures 332 from anchors 334. Implementing the actuators 330 as comb drives provides relatively large travel capability for electrostatic actuators. It is, however, expressly contemplated that the inner frame 328 may be translated by other MEMS actuators instead of comb drives or electrostatic actuators. Possible alternatives are thermal actuators, piezo actuators, or any other actuators known to a person having skill in the art.

The inner frame 328 further supports actuators 336 that translate the inner frame in the X direction. Similarly to the actuators 330 for the Y direction, the X actuators 336 are shown as comb drives, but it is expressly contemplated that the actuators for the X direction may be other electrostatic actuators, thermal actuators, piezo actuators, or any other actuators known to a person having skill in the art. The decoupling of X and Y actuators, as provided by this embodiment, allows the MEMS element to independently and directly control each direction of movement of the stage 322 and the lens 304 mounted thereon.

The MEMS element 320 may be fabricated by deep reactive-ion etching (DRIE) from both sides of a SOI wafer. This allows construction of high-aspect ratio flexures that can move easily in the X and Y directions while keeping deflections in a Z direction and related stresses small. Small area stops can be used to limit motion in the X, Y, and Z directions to avoid damage resulting from over-deflecting the stage 322. For example, X stops 338, Y stops 340, and Z stops 342 may be used to limit motion in the X, Y, and Z directions, respectively.

The basic topology of the MEMS element 320 shown in FIG. 3B provides for many possible variations. For example, the anchors 334, flexures 332, X actuators 336, and Y actuators 330 could be inside or outside of the inner frame 328. Likewise, flexures may be grouped or split, and any number of flexures that provides the necessary force and displacement characteristics may be used. As shown, wire-bond pads 344 provide the necessary voltages to actuate actuators 330 and 336. However, additional flexures or other elements may be used to route electrical nodes to the outside of the frame for easier wire-bonding, with appropriate attention paid to isolate those elements electrically from the layers of the MEMS element 320 as necessary.

Figure 4A:
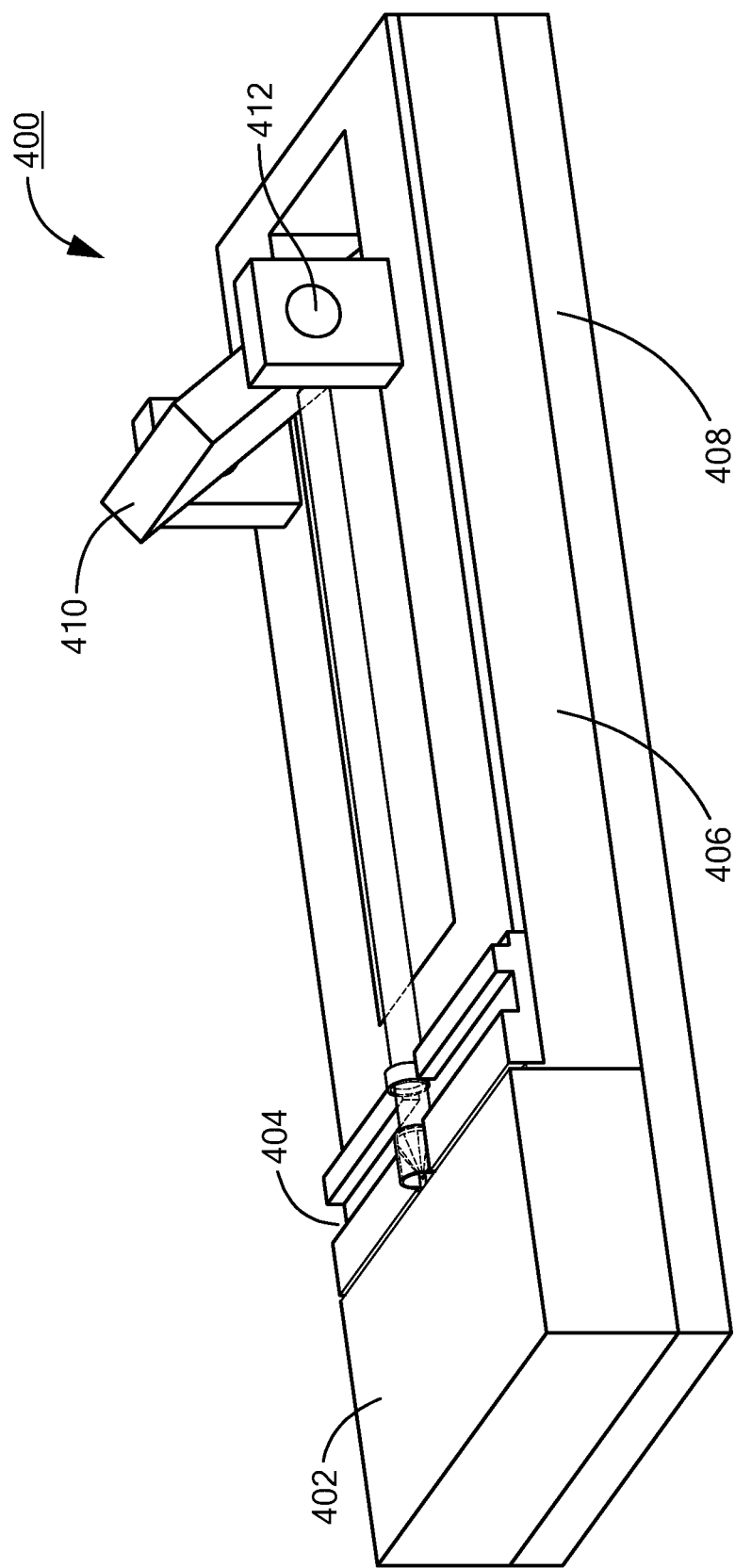
FIGS. 4A and 4B depict an optical system in accordance with another embodiment of the present invention.
Figure 4B:
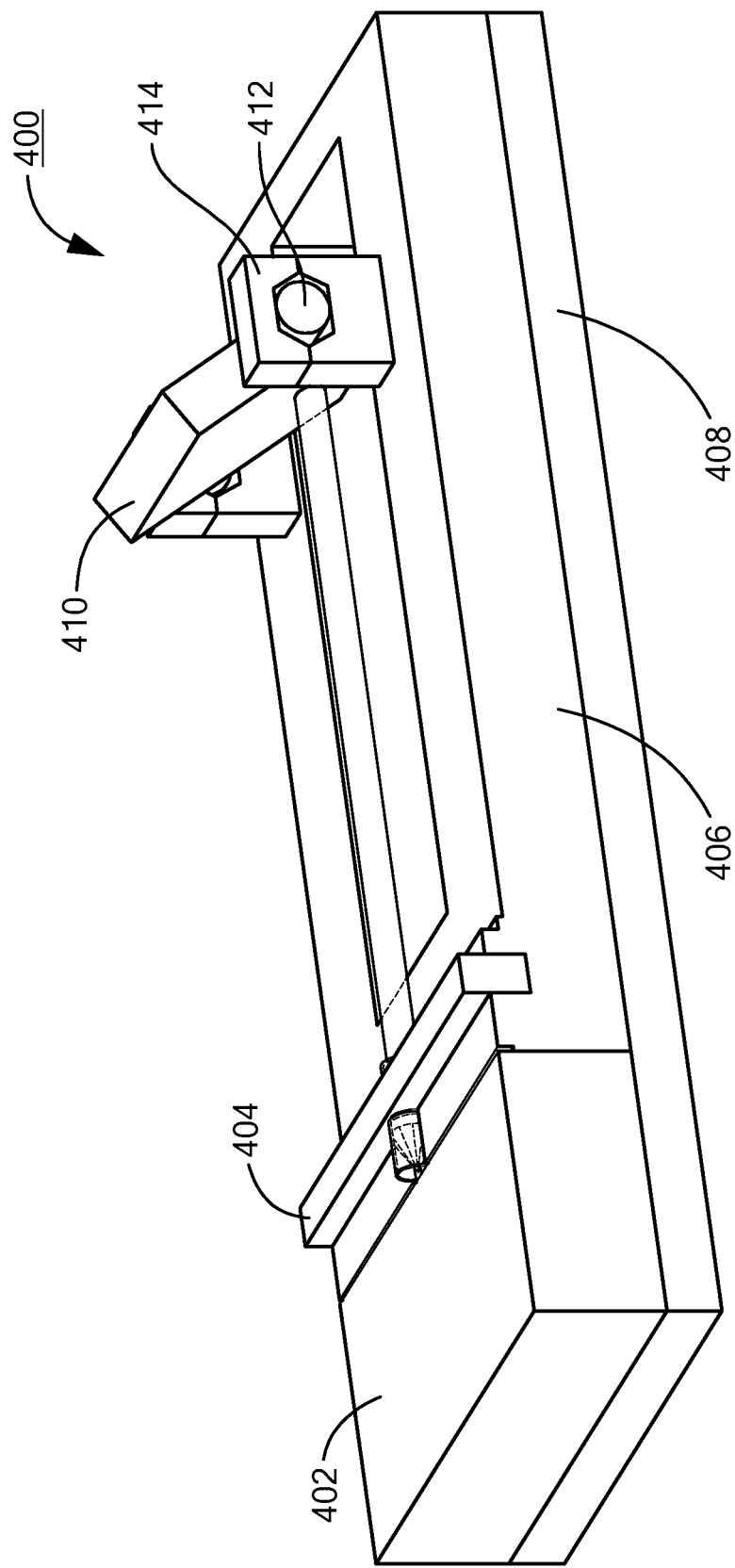

FIGS. 4A and 4B show optical system 400 as a further alternative embodiment of the present invention. A laser source 402 provides a beam of light. The optical system includes a mechanical flexure 406 and a PIC 408. The laser source 402 and flexure 406 are mounted on the PIC 408. Mounted on the flexure 406 are, for example, a lens 404 and a mirror 410. The mirror 410 is rotatably mounted on the flexure, for example with a pin mount 412. The pin mount 412 allows the mirror 410 to rotate around the axis of the pin mount. While only one lens 404 and one mirror 410 are shown in FIGS. 4A and 4B, it is expressly contemplated that more than one lens or more than one mirror are mounted on the flexure 406. In addition to or instead of lens and mirror, other optical components may be mounted on the flexure 406, such as gratings. The mechanical flexure 406 may, for example, be a LIGA structure. LIGA structures are micromechanical alignment structures that are created by lithography, electroplating, and molding.

The movable mechanical flexure 406 with lens 404 and mirror 410 is placed along the beam path between the laser source 402 and the input aperture of the PIC 408. LIGA structures can be placed in an optical path within 1 micron tolerance. They can be soldered or epoxied into place with nanometer precision. Before mounting the flexure 406 onto the PIC 408, the laser source 402, lens 404, and mirror 410 are aligned so as to achieve reasonably good coupling. After mounting, the mechanical flexure 406 is then adjusted to redirect the laser beam into a more optimal location on the input aperture of the PIC 408. Slight angular adjustments of a mechanical flexure, e.g. to adjust the position of the lens 404, only involve movements on the order of micrometers. Additionally, misalignments of the optical system 400 can later be corrected by adjusting the flexure position, whereas readjustment of optical elements is often impossible following fixing the optical system with epoxy. The flexure 406 may be adjusted by external manipulation or by built-in actuation, for example by a high-precision robotic machine (not shown). The actuators may also enable continuous updates to the alignment, e.g. via a feedback loop, ensuring that the optical system 400 remains in good alignment despite possible shock, vibration, mechanical stress, or temperature changes.

The movable mechanical flexure 406 can be placed passively or actively in the optical path. The high-precision robotic machine can then move, bend, and form the LIGA structure in the final appropriate position while monitoring the performance of the laser alignment. For example, the high-precision robotic machine may tilt the mirror 410 about the pin mount 412. The high-precision robotic machine may also move, bend, or form the flexure 406 to adjust the position of the lens 404. While a high-precision robotic machine is described here as an actuator, other actuators known to a person having skill in the art may be used instead of or in addition to the high-precision robotic machine. If the flexure 406 is placed in the optical path passively, the high-precision robotic machine adjusts the position of lens and mirror before the flexure and optical components are soldered or epoxied in place. If the flexure 406 is placed in the optical path actively, the high-precision robot machine may adjust the position of the lens and tilt of the mirror continuously to ensure that the optical system 400 remains in good alignment.

FIG. 4B shows an alternative embodiment of optical system 400. In addition to tilting the mirror 410, mirror mount 414 allows movement with a second degree of freedom. For example, the mirror 410 may be twisted about the vertical axis in its socket. To that end, pin mount 412 may have additional space around the pin to allow for the twisting motion of the mirror. The high-precision robotic machine may not only tilt the mirror 410 and adjust the position of the lens 404, but it may also twist the mirror 410 around the vertical axis. The precision robotic machine may, for example, have at least two actuators to tilt and twist the mirror, respectively. A first actuator may determine a degree of tilt of the mirror 410 about the pin mount, and a second actuator may determine twisting movement around the vertical axis.

Figure 5:
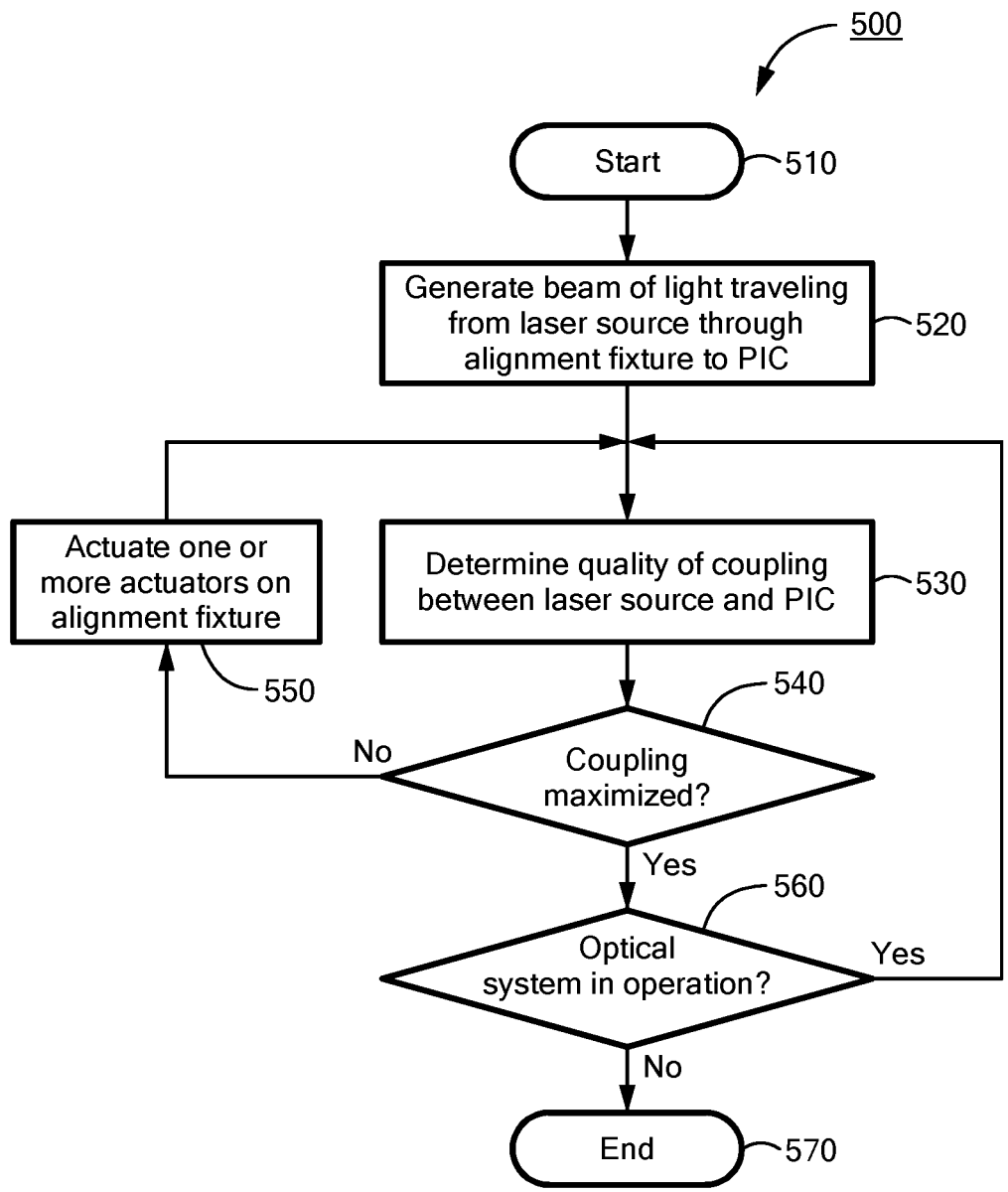
FIG. 5 shows a flowchart for a method in accordance with another embodiment of the present invention.

FIG. 5 shows a flowchart for a method 500 for adjusting coupling between a laser source and a PIC in an optical system as described above. The method begins at step 510. It then proceeds to step 520, where a beam of light generated by a laser source travels from the laser source though an alignment fixture and from the alignment fixture to an input aperture of a PIC. The alignment fixture may be a MEMS structure with one or more actuators as described in detail above. In addition, beam conditioning optics may be placed between the laser source and the alignment fixture to collimate and refocus the beam generated by the laser source. However, depending on the type of alignment fixture, no beam conditioning optics may be required.

In step 530, a quality of the coupling between the laser source and the PIC is determined. This determination may be performed in any of various ways known to a person having skill in the art. For example, the certain characteristics of the beam of light that arrives at the input aperture of the PIC could be measured. These characteristics would then be utilized to calculate the quality of coupling.

The method then proceeds to step 540, where it determines whether the coupling between the laser and the PIC is maximized. By way of example, the method could determine if the quality of the coupling calculated in the previous step is above a threshold value. If this is the case, the coupling is maximized or optimal. The threshold value may be determined by the optical characteristics of the PIC and/or the laser source.

If the coupling is not maximized, the method proceeds to step 550 and adjusts the coupling between the laser source and the PIC by actuating one or more actuators of the alignment fixture. Preferably, the actuators move one or more optical elements on the alignment fixture in a direction that optimizes coupling between the laser source and the PIC. After actuating the actuators, the method returns to step 530 to once again determine the coupling between the laser source and the PIC.

If the method determines in step 540 that the coupling is maximized, it then proceeds to step 560 where it determines whether the optical system is still in operation. This determination is made since, even though the coupling was maximized in a previous step, the coupling could have degraded during operation of the optical system. For example, degradation could happen due to thermal shift, vibrations, and stress on the optical assemblies. However, it is expressly contemplated that instead of dynamically adjusting the coupling throughout the operation of the optical system, the maximization of coupling may only be performed once after assembly of the optical system. Step 560 may then be omitted, and the method would proceed from step 540 directly to step 570.

If the optical system is still in operation, the method returns to step 530 to once again determine the coupling between the laser source and the PIC. If the method determines in step 560 that the optical system is no longer in operation, the method ends at step 570.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An apparatus comprising:
    a laser source that provides a beam of light;
    a photonic integrated circuit having an input waveguide with movable grating; and
    at least one MEMS actuator coupled to the movable grating and mounted on the photonic integrated circuit,
    wherein a first axis is defined by a major axis of the input waveguide and a second axis is defined by a minor axis of the input waveguide, and wherein the movable grating is disposed in a first plane defined by first axis and the second axis;
    wherein the laser source and the grating are aligned such that the beam of light travels from the laser source to the grating; and
    wherein the at least one MEMS actuator adjusts at least one of a position and an orientation of the movable grating within the first plane when actuated by an electrical signal to adjust coupling of the beam of light into the input waveguide of the photonic integrated circuit.

2. The apparatus of claim 1, wherein the at least one MEMS actuator adjusts the position of the movable grating along the first axis.

3. The apparatus of claim 2, wherein the at least one MEMS actuator further adjusts the position of the movable grating along the second axis.

4. The apparatus of claim 1, wherein the at least one MEMS actuator adjusts the orientation of the movable grating about a rotational axis perpendicular to the first plane.

5. An apparatus comprising:
    a laser source that provides a beam of light;
    a photonic integrated circuit having an input aperture;
    a MEMS stage having a first surface; and
    at least one lens mounted on the MEMS stage,
    wherein the laser source, the at least one lens, and the photonic integrated circuit are aligned such that the beam of light travels from the laser source to the lens and from the lens to the input aperture of the photonic integrated circuit,
    wherein the MEMS stage comprises at least one actuator configured to move the MEMS stage in at least one direction when actuated by an electrical signal to adjust coupling of the beam of light into the photonic integrated circuit; and
    wherein the MEMS stage is movable in a plane parallel to the first surface and a direction perpendicular to the first surface.

6. The apparatus of claim 5, wherein the at least one actuator moves the MEMS stage in the plane parallel to the first surface.

7. The apparatus of claim 6, wherein the at least one actuator further moves the MEMS stage in the direction perpendicular to the first surface.

8. The apparatus of claim 5, wherein the at least one actuator is a comb drive.

9. The apparatus of claim 7, wherein the MEMS stage has a range of movement that is larger in the plane parallel to the first surface than in the direction perpendicular to the first surface.

* * * * *

UNITED STATES PATENT AND TRADEMARK OFFICE
CERTIFICATE OF CORRECTION

PATENT NO. : 11,048,053 B2
APPLICATION NO. : 16/697821
DATED : June 29, 2021
INVENTOR(S) : Moebius et al.

Page 1 of 1

It is certified that error appears in the above-identified patent and that said Letters Patent is hereby corrected as shown below:

In the Claims

In Column 12, Line 23:
Replace "by first axis"
With "by the first axis"

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*